Jan. 9, 1934.  L. WALSH  1,942,786
COUPLING SYSTEM
Original Filed Sept. 26, 1927   5 Sheets-Sheet 1
Fig. 1,
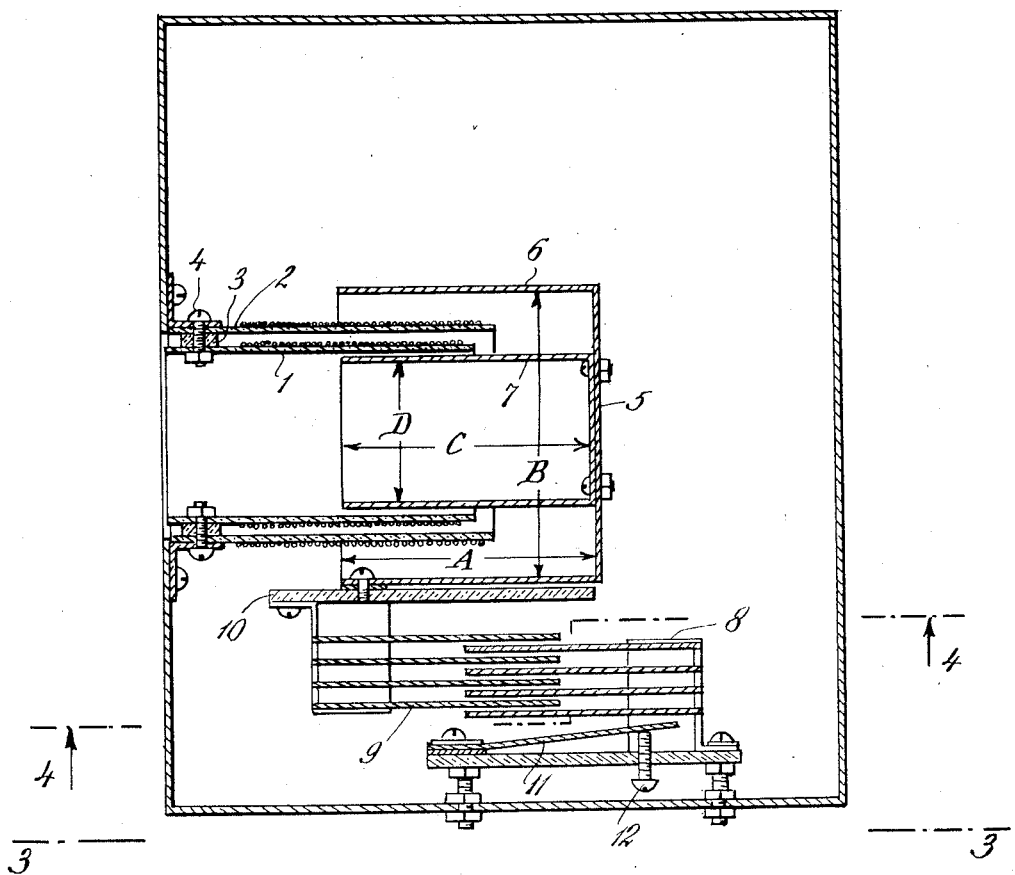
INVENTOR
Lincoln Walsh
BY
Pennie, Davis, Marvin and Edmonds
ATTORNEYS Jan. 9, 1934.   L. WALSH   1,942,786
COUPLING SYSTEM
Original Filed Sept. 26, 1927   5 Sheets-Sheet 2
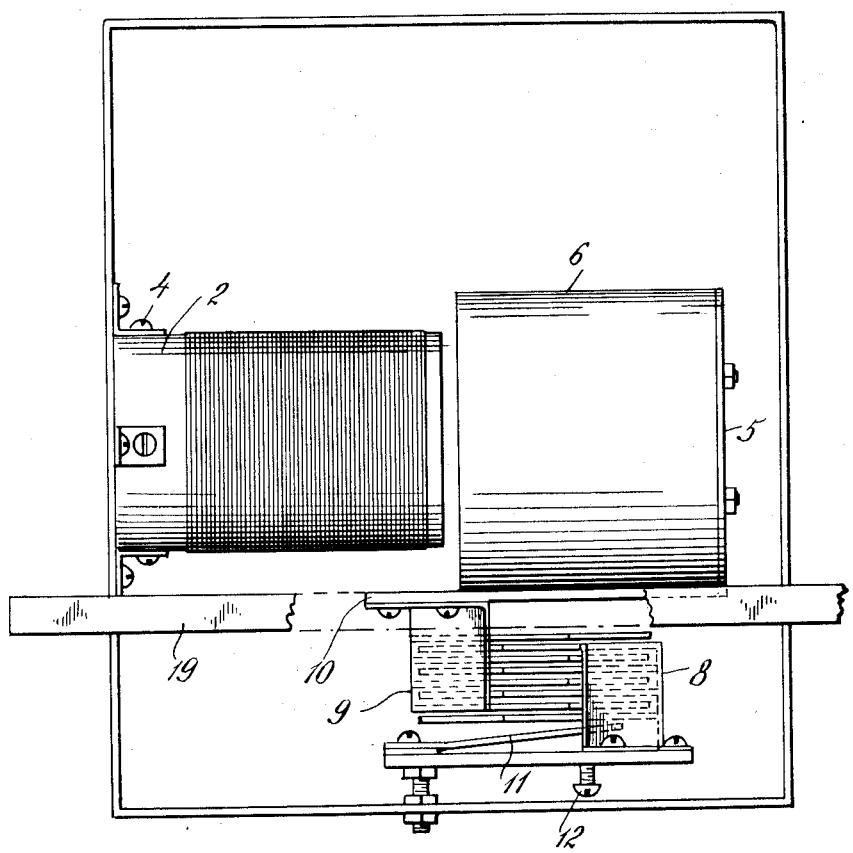
Fig. 2,
INVENTOR
Lincoln Walsh
BY
Pennie, Davis, Marvin and Edmonds
ATTORNEYS

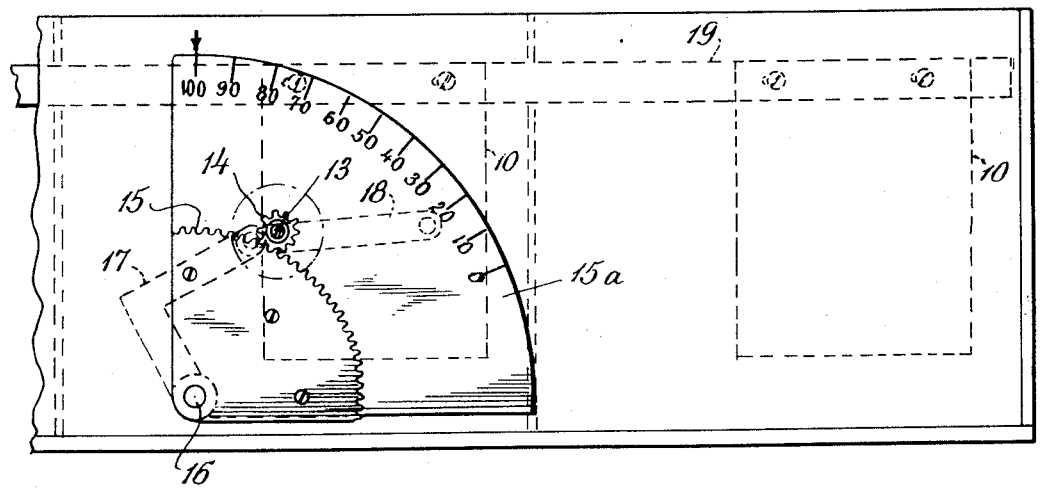
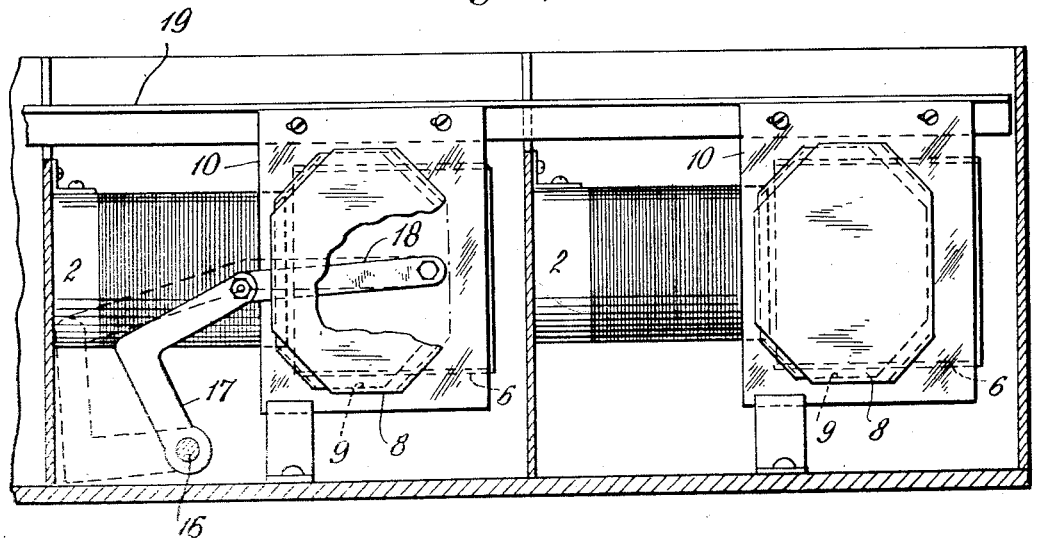

Jan. 9, 1934.    L. WALSH    1,942,786
COUPLING SYSTEM
Original Filed Sept. 26, 1927    5 Sheets-Sheet 4

INVENTOR
Lincoln Walsh
BY
Pennie, Davis, Marvin and Edmonds
ATTORNEYS

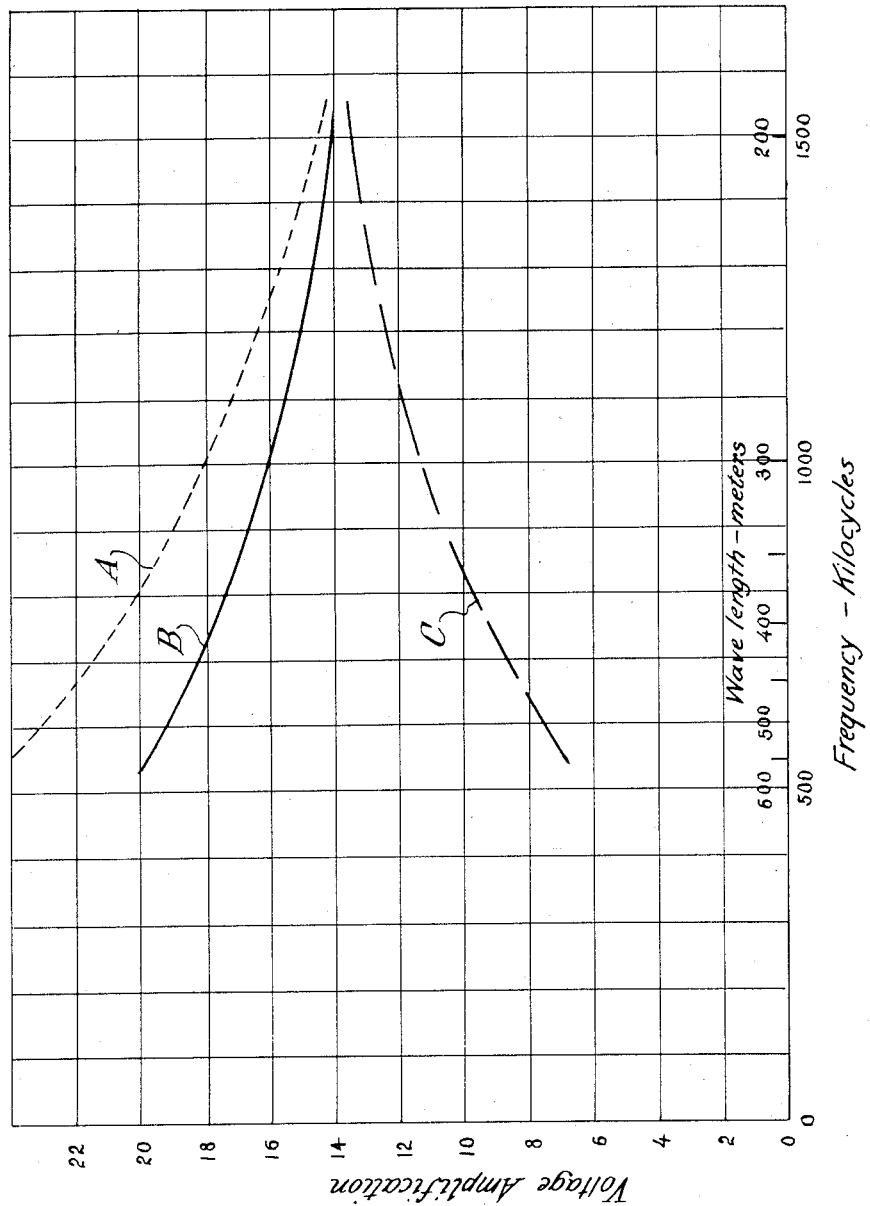

Patented Jan. 9, 1934

1,942,786

UNITED STATES PATENT OFFICE 1,942,786

COUPLING SYSTEM

Lincoln Walsh, Elizabeth, N. J., assignor to Hazeltine Corporation, Jersey City, N. J., a corporation of Delaware Original application September 26, 1927, Serial No. 222,009. Divided and this application June 22, 1932. Serial No. 618,681, and in Canada December 14, 1927

9 Claims. (Cl. 250—16)

The present invention relates to radio-frequency vacuum tube amplifiers of the transformer-coupled type and, more particularly, tuned amplifiers intended to operate over a fairly wide range of frequencies, as for example, in "broadcast" receivers. This application is a division of my original application Serial No. 222,009, filed September 26, 1927.

In the design of tuned radio-frequency amplifiers one of the controlling factors to be dealt with is the tendency toward excessive regeneration and consequent oscillation which is due mainly to the coupling capacity between the grid and plate of each vacuum tube. Some provision must always be made against this tendency, preferably by neutralization. But since neutralization involves the use of a fixed neutralizing capacity which is balanced against the coupling capacity of a vacuum tube and since individual vacuum tubes, even of the same type and manufacture, are bound to vary to a certain extent, it follows as a direct result that there is a limit to the amplification per stage at any given frequency beyond which it is impracticable to go. Since the inter-electrode (plate-grid) capacitive reactance decreases with rising frequency, thus allowing a greater amount of high-frequency energy to be fed back from the plate circuit to the grid circuit of each tube, the permissible amplification per stage also decreases with rising frequency. As a matter of experience, the permissible amplification per stage at 1500 kilocycles per second is very much less than at 500 kilocycles per second. These frequencies are the limits of the broadcasting band as now established. Theory and experience both indicate that the amplification should vary inversely as the square root of the frequency in order that adequate manufacturing tolerance in the vacuum tube coupling capacity may be allowed.

On the other hand, the amplification per stage obtainable with coupling transformers of the conventional type, that is, transformers having fixed coils of high step-up ratio and low losses, is less at the lower than at the higher frequencies. As between the frequencies 500 kilocycles per second and 1500 kilocycles per second the actual amplification per stage is very much less at the lower frequency. Thus, while the permissible amplification per stage at the lower frequency end of the broadcast band is much greater than at the high frequency end, the characteristics of the conventional radio-frequency transformer are such that the actual amplification obtainable is very much less at the low frequencies than at the high frequencies.

It has sometimes been attempted to modify the amplification characteristics of the conventional transformer to increase the amplification at low frequencies without also increasing the amplification at high frequencies. This can be done by introducing sources of energy loss which are mainly effective at high frequencies, but this expedient has the serious disadvantage of impairing the selectivity at high frequencies.

Not only is the lower-frequency amplification with conventional transformers limited by the instability which would occur at higher frequencies, but the conventional transformer arrangement does not permit of high amplification at low frequencies irrespective of instability. The reason is that in order to be able to tune to all frequencies within the broadcast band it is necessary to employ a tuning condenser having relatively great capacity at the lower frequencies. Such a large capacity in combination with transformer coils of conventional small dimensions and such as will give satisfactory fidelity, introduces an excessive secondary conductance at low frequencies. The high secondary conductance thus introduced has the effect of reducing the amplification at low frequencies, as may be easily demonstrated both mathematically and by actual performance tests.

The primary object of the present invention is to provide a radio-frequency amplifier from which may be obtained, at all frequencies within its range, the highest amplification consistent with stability, as limited by the customary tolerance in coupling capacities of vacuum tubes, without impairing the selectivity at high frequencies (where this is naturally the poorest), or the fidelity at low frequencies (where the latter characteristic is naturally the poorest).

Another object, in furtherance of the primary invention, is to provide a structural and electrical arrangement which is adequately simple and trouble-proof in operation.

The present invention accomplishes these ends by providing means adapted to change simultaneously the voltage ratio of the radio-frequency coupling systems, the self-inductance of the tuning inductance and the tuning capacity, whereby the maximum permissible degree of amplification, or any desired approximation thereto, is obtained at all frequencies at which the receiver is designed to operate.

Considering a radio-frequency coupling system of the conventional type comprising a fixed-ratio transformer whose primary is included in the plate circuit of an amplifying vacuum tube and whose secondary winding together with a tuning condenser is connected in the grid-filament (input) circuit of a succeeding vacuum tube, the greatest amplification would occur at the highest frequency to which the receiver may be tuned, and the least amplification at the lowest frequency. Therefore, it is ordinarily necessary to design such transformers so as to avoid exceeding the permissible amplification per stage at the highest frequency, as limited by the tendency toward instability.

In so far as the transformer per se is concerned, the factors which ordinarily determine the degree of amplification are the self-inductance of the secondary winding, the mutual inductance between primary and secondary winding and the conductance (or resistance) of the secondary winding. The voltage ratio, or simply "the ratio" of a transformer the secondary circuit of which is tuned is substantially equal to the ratio of the secondary self-inductance to the mutual inductance. In the conventional radio-frequency transformer now referred to, both the secondary self-inductance and the mutual inductance remain constant irrespective of the frequency, and these values must, therefore, be determined by the requirement that the maximum permissible amplification must not be exceeded at the highest operating frequency. If the ratio of secondary self-inductance to the mutual inductance is lowered as the operating frequency is lowered then the amplification per stage will in general be increased. Furthermore, if the secondary self-inductance is increased as the frequency is lowered, it will be possible to obtain the desired amplification while maintaining fidelity and compactness of coil construction. The present invention involves the proper adjustment of the inductances and the tuning capacity so as to obtain the maximum permissible amplification at each frequency within the band of frequencies for which the receiver is designed.

Theoretically there are a variety of ways in which this can be done but the means and method described hereinafter have been found highly satisfactory from every standpoint and are, accordingly, regarded as representing the preferred embodiment of the invention. In the structure herein described each radio-frequency transformer is provided with a movable metallic shield comprising two cylindrical cup-like parts arranged coaxially, one within the other. The shields or cups, as they may conveniently be called, are preferably made of a non-magnetic metal of high conductivity, such as copper or aluminum. Each cup is arranged to slide longitudinally with respect to its associated transformer. The larger cup is adapted to variably envelop the outer winding, which is the secondary, while the smaller cup is adapted to move longitudinally within the smaller or primary winding. The effect of moving the metallic shields or cups with respect to the transformer windings is to vary both the secondary self-inductance and the mutual inductance, each at the desired rate. The effect of the metal cups or shields disposed closely adjacent the windings of the transformers is to restrict the cross section and thereby to increase the reluctances of the magnetic paths, thus reducing the inductances.

The transformers may accordingly be designed with a view to obtaining the maximum permissible amplification per stage at the lowest operating frequency—this value being much higher than that of the permissible amplification at the highest operating frequency. Then by providing means for moving the metal shields or cups so as to increasingly envelop the transformer windings as the operating frequency is increased the amplification may be decreased to the proper value for each operating frequency.

In the preferred form of this invention the movement of the metal shield or shields relatively to the transformer windings is accomplished automatically by means of suitable mechanical connections with the tuning control or controls, and preferably the several stages of amplification are adjusted simultaneously by a single manual control. However, some of the advantages of the invention together with greater flexibility may be obtained by independently operating the shields and the tuning condensers.

With reference to the drawings which accompany this specification,

Fig. 1 is a cross sectional view of a coupling unit comprising a radio-frequency transformer with its associated metal shield together with a variable tuning condenser and a neutralizing condenser, all of which are assembled within a sheet metal receptacle;

Fig. 2 is a plan view of the coupling unit shown in Fig. 1 and is taken as viewed from the same observation point as Fig. 1;

Fig. 3 is a partial elevational view taken along the line 3—3 of Fig. 1 and looking toward the front of a radio receiver. This figure illustrates the operating mechanism for the shields and tuning condensers;

Fig. 4 is a sectional view taken along the line 4—4 of Fig. 1;

Fig. 6 is a comparative amplification graph representing by appropriate curves the amplification obtainable at different frequencies with a conventional tuned amplifier and with an amplifier in accordance with this invention.

Figure 5:
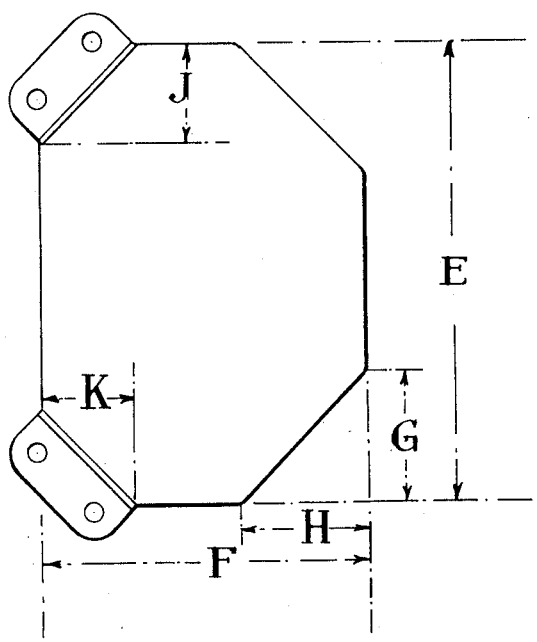
Fig. 5 is a plan view of a condenser plate.

In Figs. 1 and 2 there are illustrated plan views, Fig. 1 being in section, of a radio-frequency transformer with its associated metallic cup-like shields together with a tuning condenser and a neutralizing condenser—the arrangement shown being in accordance with one of the preferred embodiments of the invention. The transformer per se comprises two coaxial tubes 1 and 2 of dielectric material such as formica. The tube 1 is mounted inside the tube 2, being spaced therefrom by means of a suitable spacing ring 3 and secured by bolts 4. In this particular case there is, in addition to the primary winding, a neutralizing winding having an equal number of turns, wound on the tube 1. The turns of the primary and neutralizing windings are interleaved. The secondary is wound on the tube 2. The metallic shield structure 5 comprises two coaxial cylindrical cup-like members, or metallic cylinders, 6 and 7. The two cups are secured together forming a unit so that there is created a cylindrical slot between the inner cylindrical wall of the outermost cup and the outer cylindrical wall of the innermost cup. The tuning condenser comprises two identical elements, namely, a stator 8 and a movable element 9. Each of these elements has four plates, as shown. The plates of one element are interleaved with those of the other. The movable element 9 is rigidly secured to the shield 5 through the medium of a rigid arm, or connecting member 10 of insulating material, which mechanically links the metallic shield structure and the movable plates. The shield 5 together with the movable condenser element 9 is adapted to slide axially with respect to the transformer coils. Thus it will be seen that as the plates of the tuning condenser move together—the capacity of the condenser thereby increasing—the shield 5 is moved to the right, as shown in Fig. 2, whereby it decreasingly affects the magnetic field or path of the transformer causing both the secondary self-inductance and the mutual inductance to increase. When the cup 6 envelops the secondary winding to the maximum extent the reluctance of the magnetic field is a maximum, and the secondary self-inductance is consequently reduced to a minimum. Likewise the mutual inductance between primary and secondary windings is decreased as the cup 7 is moved into closer relation with the primary winding, that is, to the left as viewed in Fig. 1. While the two shields interact in their effects the outer one 6 affects mainly the secondary self-inductance, and the inner one 7 the mutual inductance. With the proportions indicated in Fig. 1—of which specific dimensions will be given—the mutual inductance varies at a faster rate than the secondary self-inductance, giving the desired variation in the ratio. Although the arrangement illustrated comprising two coaxial cups constitutes the preferred embodiment of the invention, it has been found that similar but less ideal results may be obtained by omitting either one or the other of the cups 6 and 7. Since the function of the shields is to vary the reluctance of the magnetic field it will be apparent that the shield or shields may take a variety of forms besides the specific arrangement illustrated.

As a part of the tuning condenser structure illustrated in Figs. 1 and 2 there is shown a flexible conducting element 11 which is adapted to function as one plate of a neutralizing condenser. This flexible plate may be adjusted toward and away from the adjacent fixed plate of the stator 8 by means of the adjusting screw 12. The capacity between the element 11 and the stator of the tuning condenser may thus be adjusted to a proper value for effecting neutralization.

In order to clarify the illustration, the operating mechanism for the two tuning condensers and shields has been omitted from Figs. 1 and 2. A suitable mechanism for this purpose is illustrated in Figs. 3 and 4. It will be realized, however, that the operating mechanism illustrated in Figs. 3 and 4 constitutes only one of a great variety of ways in which the same results may be obtained, and that the invention is in nowise dependent upon the particular mechanism by which the operation of the tuning condensers and shields is brought about.

The operating mechanism of Figs. 3 and 4 is arranged for the unitary operation of two sets of tuning condensers and shields. It may obviously be extended to take care of as many stages of amplification as may be desired.

Figs. 3 and 4 are views taken along the lines 3—3 and 4—4, respectively, of Fig. 1 and drawn to a somewhat smaller scale than Fig. 1. As previously stated, the operating mechanism shown in Figs. 3 and 4, and now to be described, has been omitted from Figs. 1 and 2 in order to clarify the disclosure. Referring to Fig. 3, the tuning control knob (not shown) is secured to a shaft 13 on which is fixed a small pinion 14 which meshes with a toothed quadrant 15 carried by a shaft 16. A graduated dial 15a is attached to and moves with the quadrant 15. A lever arm 17, which for convenience is made in the form of an L, is secured to shaft 16 and is rotatable therewith. To the lever 17 is pivotally secured a link 18 which is connected to the member 10 (shown also in Figs. 1 and 2). Since both the shield 5 and movable condenser element 9 are attached to the member 10, it is apparent that these parts all move together in a direction parallel to the axis of the transformer in response to rotation of the tuning control knob. As shown in Figs. 2 and 4, the members 10 are secured to a slidable support 19. The latter is, for convenience and rigidity, made of an angle cross-section, and is supported on suitable bearings on which it is free to slide longitudinally but not otherwise. In Fig. 4 the tuning condenser is shown partially broken away in order that the pivotal connection of the link 18 to the supporting member 10 may be shown in full lines.

It should be clear from the foregoing description that both of the tuning condensers and shields indicated in Fig. 4 are operated from the same control knob, and that as many additional sets of condensers and shields as might be desired could be added and operated through the one control. Three stages of tuned radio-frequency amplification have been found very suitable.

Incidentally, the present invention lends itself very advantageously to unitary tuning control. This is because of the fact that the tuning condensers are preferably of small maximum capacity as compared with the tuning condensers ordinarily used in broadcast receivers of the conventional type. The reason why a particularly small tuning condenser can be used to cover a wide band of frequencies is that the tuning is accomplished by varying the secondary self-inductance at the same time that the tuning capacity is varied. Since the tuning condensers may be of unusually small maximum capacity the plates may be heavier and spaced farther apart without excessive bulkiness. For these reasons it is possible to maintain a considerably greater precision in manufacturing the condensers; and the tuning of the several stages of amplification under a single control may, therefore, be carried out with greater accuracy or with less difficulty.

As a specific example, the dimensions of the transformer, shield and tuning condenser shown in Figs 1 and 2 will now be given. The tube 1 is made of natural formica 1¾ inch outside diameter, 3⅛ inches long, and $\frac{1}{32}$ inch thick. On this tube are wound a primary coil and a neutralizing coil. The turns of these coils are interleaved, each coil having 36 turns of number 38 double-silk-covered copper wire, 16 double turns per inch. The tube 2 is made of the same material, 2¼ inches outside diameter, 3⅜ inches long and $\frac{1}{16}$ inch thick. On this tube is wound a secondary coil consisting of 120 turns of number 26 enameled copper wire, 48 turns per inch. The cup 6 which forms part of the metal shield is made of sheet copper 0.031 inch thick. Referring to Fig. 1, dimension A is 2$\frac{11}{16}$ inches and B is 2.95 inches. Cup 7 is also made of sheet copper 0.031 inch thick. Dimension C is 2⅝ inches and D is 1½ inches.

With the above dimensions, the step-up ratio of the transformer is at all frequencies substantially higher than that giving greatest amplification; or, in other words, the input conductance at resonance is substantially higher than the plate conductance of the preceding vacuum tube. This is for the purpose of increasing selectivity and stability, as explained in Patent No. 1,648,808, issued to Louis A. Hazeltine on November 8, 1927.

The tuning condenser elements 8 and 9 are identical—one being fixed and the other movable. Each consists of four aluminum plates 0.031 inch thick and spaced 0.187 inch apart. A plan view of one condenser plate is shown in Fig. 5. The dimensions indicated in Fig. 5 are as follows:

|   | Inches |
|---|---|
| E | 3½ |
| F | 2½ |
| G | 1 |
| H | 1 |
| J | ¾ |
| K | ¾ |

This particular condenser was designed with a view to obtain tuning characteristics lying approximately midway between straight-line-frequency variations and straight-line-wavelength variations. The object of doing this is to make the apparent sharpness of tuning substantially the same at all settings of the tuning control dial. The invention is, of course, in no sense dependent upon the particular form of tuning condenser which may be used.

With transformers, shields and condensers of the dimensions specified above and in accordance with the design illustrated in Figs. 1 and 2 employed in a multistage amplifier using vacuum tubes of the 201—A type having an amplification factor of about 8, the results actually obtained are indicated by curve B of Fig. 6. On this graph sheet the curve A shows the calculated maximum permissible amplification at all frequencies between about 550 kilocycles per second and 1550 kilocycles per second. According to the theory on which curve A is based, the amplification should vary inversely as the square root of the frequency in order that a practical manufacturing tolerance may be allowed with respect to the plate-grid coupling capacity. This is well confirmed by actual experience. It will be observed that curve B closely follows the form of curve A and, therefore, indicates an amplification which varies inversely as the square root of the frequency. In calculating the permissible amplification at the various frequencies from which curve A was plotted a tube capacity tolerance of 0.5 micromicrofarad was allowed. This tolerance represents the permissible manufacturing deviation of the internal capacity between the plate and grid. It is this unavoidable deviation which exercises the greatest influence in limiting the permissible amplification. Curve C, Fig. 6, indicates the radio-frequency amplification obtainable in a good representative neutralized receiver having radio-frequency transformers of the general form shown in Fig. 1 but without the metallic shields or equivalent means for accomplishing the same purpose. From an examination of curve C it will be at once apparent that the amplification at the high-frequency end of the band is much greater than at the low-frequency end. Also by comparison of curve C with curve A it will be seen that the amplification at the low-frequency end is very much less than the permissible amplification, whereas it closely approaches the maximum permissible amplification at the high-frequency end.

Curve B indicates how the large discrepancy between permissible amplification and actual amplification at low frequencies and, in fact, over substantially the entire band of frequencies except for the immediate region of the upper end, has been corrected by the use of metal shields as herein described.

Figure 7:
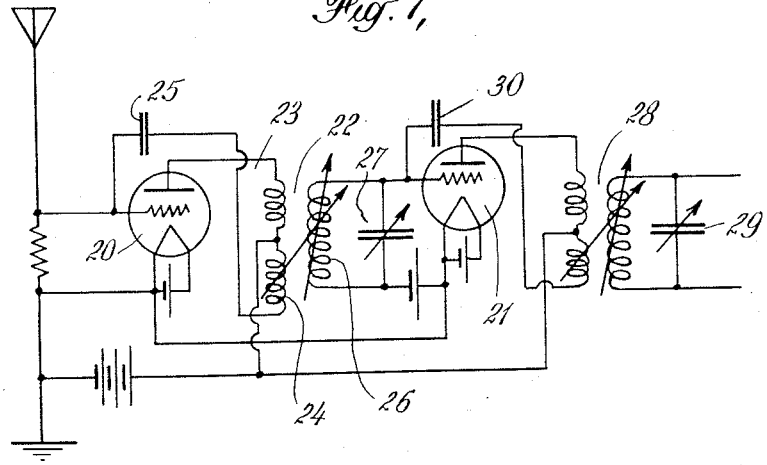
Fig. 7 is a partial circuit diagram of a neutralized radio-frequency amplifier adapted for use in conjunction with this invention.

The specific structure which has been described as an example representative of the preferred embodiment of the invention is applicable for use in the radio-frequency portion of a neutralized broadcast receiver of which a partial circuit is shown diagrammatically in Fig. 7. This figure illustrates diagrammatically two stages of neutralized radio-frequency amplification the output of which may be passed through one or more additional stages of radio-frequency amplification and thence to a detector or it may be passed directly to the detector and thence to an audio-frequency amplifier.

In Fig. 7, the three-electrode vacuum tube amplifiers 20 and 21, respectively, are coupled in cascade through the medium of a radio-frequency transformer 22 which may be the transformer shown in Figs. 1 and 2. The primary winding 23 and the neutralizing winding 24 of this transformer are interleaved on the same tube, as previously described in connection with Fig 1, and may be in all respects identical. One end of the neutralizing coil 24 is connected to a neutralizing condenser 25 the other terminal of which is connected to the grid of the tube 20. This is in accordance with one form of the well known Hazeltine method of neutralization. The secondary winding 26 of the transformer 22, Fig. 7, may be the same as specified hereinbefore in connection with the description of Fig. 1. The tuning condenser 27 may be identical with that shown in Figs. 1, 2 and 5. The transformer 28 which couples the output side of tube 21 with the next succeeding tube (not shown) may be identical with transformer 22 and, of course, the tuning condenser 29 may be identical with the condenser 27. Likewise the neutralizing condenser 30 may be in accordance with the disclosure of Fig. 1 wherein the flexible element 11 comprises one plate of a neutralizing condenser of which the stator of the tuning condensor forms the other plate.

The present invention has been developed in conjunction with neutralized amplifiers of the type indicated in general by Fig. 7 and is particularly well adapted for use in connection with that type of neutralization, but it may be used effectively with other methods of neutralization and oscillation suppression.

I claim:

1. In a vacuum tube coupling system, a radio-frequency transformer comprising a pair of coils each having an axis, a metallic structure adapted to be moved coaxially with respect to said coils and means for moving said structure relative thereto, said structure comprising a member of electrically conducting material having a cylindrical slot within which said coils may be inserted, whereby said structure is adapted to variably envelop said coils when moved relatively thereto.

2. A radio-frequency transformer comprising primary and secondary windings located coaxially with respect to each other, a shield for said windings comprising a pair of metallic cups located one within the other and joined at their bases, the outermost cup having an inner cylindrical wall and the innermost cup having an outer cylindrical wall, said windings being positioned between said walls, and means for moving said cups in a coaxial direction with respect to said windings so that when said shield is moved said windings are situated at various relative positions between said cylindrical walls.

3. A high-frequency transformer comprising cylindrical primary and secondary windings, a shield for said windings comprising a pair of metal cylinders coaxially situated one within the other and electrically joined together at one end of each cylinder, said cylinders being located one within and one without said coils, and means for moving said shield coaxially with respect to said coils so that said coils are variably enveloped by said cylinders.

4. A radio-frequency transformer comprising a plurality of coils, a metallic structure adapted to be moved co-axially with respect to said coils and means for moving said structure relative thereto, said structure comprising a member of electrically conducting material having a slot within which said coils may be inserted, whereby said structure is adapted to variably envelop said coils when moved relatively thereto.

5. In a radio-frequency coupling system, an inductance coil and a condenser having a movable set of plates effectively connected in parallel therewith, a conductive metallic structure comprising a cup-like member movable axially with respect to said coil and being adapted to alter the magnetic path thereof and a rigid arm mechanically linking said metallic structure and said movable set of plates, whereby said member may be axially moved simultaneously with said movable set of plates.

6. In combination, an inductance coil and a movable condenser, said coil having associated therewith a cup-like metallic shielding member movable axially with respect to said coil and being adapted to envelop and thereby alter the magnetic path of said coil, said condenser having a set of fixed plates and a set of movable plates movable within and without said fixed plates, and a rigid arm mechanically linking said shielding member and said set of movable plates, the disposition being such that movement of said rigid arm causes said shielding member to move away from said coil when said movable plates move within said fixed plates, and vice versa.

7. A combination according to claim 6 in which said cup-like shielding member comprises a pair of metal cylinders situated one within and one without said coil.

8. In combination, an inductance coil and a variable condenser, said coil having associated therewith a cup-like metallic shielding member movable axially with respect to said coil and being adapted to envelop and thereby alter the magnetic path of said coil, said condenser having a set of fixed plates and a set of movable plates which are movable within and without said fixed plates in the same linear direction as said shielding member, and an arm rigidly linking said shielding member and said set of movable plates, and means for moving said shielding member, said movable condenser plates and said rigid arm as a unit in said linear direction, whereby said shielding member increasingly envelops said coil and said movable plates are simultaneously withdrawn from said fixed plates, and vice versa.

9. In combination, a radio-frequency transformer and a variable condenser, said transformer comprising primary and secondary windings located co-axially with respect to each other, a shield adapted to be moved co-axially with respect to said windings, said structure comprising a member of electrically conducting material having a cylindrical slot within which said coils may be inserted, said variable condenser comprising a group of fixed plates and a group of variable plates adapted to be interleaved between said fixed plates, a rigid arm rigidly fastened at one end to said shield structure and at the other end to said group of movable plates, said arm being movable in the linear direction which is co-axial with said windings, whereby said shield structure and said movable plates are simultaneously moved in the same direction by motion imparted to said arm.

LINCOLN WALSH.